(12) United States Patent
Lowe et al.

(10) Patent No.: US 7,140,325 B2
(45) Date of Patent: Nov. 28, 2006

(54) POUR-ON APPLICATION METHOD AND DEVICES

(75) Inventors: Lionel Barry Lowe, Dural (AU); James Terenc Rothwell, South Turramurra (AU); Kristina Clare Hacket, North Sydney (AU)

(73) Assignee: Eli Lillyuand Company, Indianapolis, IN (US)

( * ) Notice: Subject to any disclaimer, the term of this patent is extended or adjusted under 35 U.S.C. 154(b) by 0 days.

(21) Appl. No.: 10/398,111

(22) PCT Filed: Oct. 30, 2001

(86) PCT No.: PCT/AU01/01396

§ 371 (c)(1),
(2), (4) Date: Mar. 28, 2003

(87) PCT Pub. No.: WO02/36041

PCT Pub. Date: May 10, 2002

(65) Prior Publication Data

US 2004/0040518 A1 Mar. 4, 2004

(30) Foreign Application Priority Data

Oct. 31, 2000 (AU) .................................. PR 1133

(51) Int. Cl.
*A01K 13/00* (2006.01)
*B05B 1/06* (2006.01)
*B05B 1/14* (2006.01)

(52) U.S. Cl. ...................... 119/652; 119/665; 239/550

(58) Field of Classification Search ............... 119/652, 119/650, 651, 656, 665, 666, 667, 669; 239/550, 239/554, 556, 565, 566, 567, 568, 530; 401/28, 401/265
See application file for complete search history.

(56) References Cited

U.S. PATENT DOCUMENTS

| | | | | |
|---|---|---|---|---|
| 273,940 A | * | 3/1883 | Bonninghausen | ........... 239/565 |
| 314,326 A | * | 3/1885 | Galloway | .................... 239/565 |
| 321,011 A | * | 6/1885 | Duncan et al. | ............. 239/153 |
| 454,117 A | * | 6/1891 | Myers | .......................... 47/1.5 |
| 1,044,131 A | * | 11/1912 | Brown | ....................... 239/556 |
| 1,112,261 A | * | 9/1914 | Carter | ............................. 285/8 |
| 1,164,940 A | * | 12/1915 | Jackson | ...................... 239/530 |
| 1,207,790 A | * | 12/1916 | Peterson | ..................... 239/280 |
| 2,263,070 A | * | 11/1941 | Cusick | .................... 52/742.13 |
| 2,499,174 A | * | 2/1950 | Turner | ......................... 119/665 |
| 2,532,251 A | * | 11/1950 | Whitmire et al. | ........... 119/652 |
| 2,660,251 A | * | 11/1953 | Birosh | ........................ 119/604 |

(Continued)

FOREIGN PATENT DOCUMENTS

AU        16919/76        2/1978

(Continued)

*Primary Examiner*—Yvonne R. Abbott
(74) *Attorney, Agent, or Firm*—Caren D. Geppert

(57) ABSTRACT

The present invention relates to a device for applying a liquid pesticidal formulation to an external surface of a domestic animal, the device comprising an inlet and a plurality of spaced apart outlets, wherein the device is adapted such that when the middle of the device is positioned substantially above the spine of the animal, at least one outlet is positioned substantially above each flank of the animal. The invention also relates to a method for the treatment or prophylaxis of parasitic infestations, including ectoparasitic and/or endoparasitic infestations, of domestic animals comprising topically administering to said animal a pour-on pesticidal formulation to a region of the external surface of an animal extending from one flank to the opposing flank.

3 Claims, 6 Drawing Sheets

U.S. PATENT DOCUMENTS

| | | | | |
|---|---|---|---|---|
| 2,697,415 A | * | 12/1954 | Peterson | 119/652 |
| 2,832,086 A | * | 4/1958 | Wells | 401/1 |
| 3,159,144 A | * | 12/1964 | Duncan et al. | 119/652 |
| 3,170,171 A | * | 2/1965 | Mayhew et al. | 4/615 |
| 3,285,231 A | | 11/1966 | Johnson | |
| 3,487,668 A | * | 1/1970 | Fuchs, Jr. | 72/55 |
| 3,567,120 A | * | 3/1971 | Suda | 239/8 |
| 3,673,827 A | * | 7/1972 | Hales | 68/222 |
| 3,854,665 A | * | 12/1974 | Rodgers | 239/242 |
| 3,858,267 A | * | 1/1975 | Swannie | 15/236.04 |
| 3,898,429 A | * | 8/1975 | Chodak | 392/476 |
| 4,182,497 A | * | 1/1980 | Ferreira et al. | 239/532 |
| 4,298,166 A | * | 11/1981 | White et al. | 239/24 |
| 4,587,874 A | * | 5/1986 | Lupke et al. | 83/340 |
| 4,718,700 A | * | 1/1988 | Horch et al. | 285/133.5 |
| 4,785,517 A | * | 11/1988 | Takano | 29/235 |
| 4,899,940 A | * | 2/1990 | Leaver | 239/526 |
| 4,930,706 A | * | 6/1990 | Merlin | 239/754 |
| 4,987,861 A | * | 1/1991 | Lemire et al. | 119/667 |
| 5,033,775 A | * | 7/1991 | Matte et al. | 285/133.11 |
| D321,574 S | * | 11/1991 | Shevers et al. | D32/15 |
| 5,292,074 A | * | 3/1994 | Clark et al. | 239/546 |
| 5,381,964 A | * | 1/1995 | Reyna | 239/566 |
| 5,390,960 A | * | 2/1995 | Blake | 285/3 |
| 5,419,600 A | * | 5/1995 | Tisbo et al. | 294/54.5 |
| D365,141 S | * | 12/1995 | Palestrant | D23/213 |
| 5,653,392 A | * | 8/1997 | Wells | 239/722 |
| 5,787,588 A | * | 8/1998 | Tisbo et al. | 30/164.5 |
| 5,944,910 A | * | 8/1999 | Fujii | 134/6 |
| D413,963 S | * | 9/1999 | Krueger | D23/214 |
| 5,957,610 A | * | 9/1999 | Yamanaka | 401/221 |
| D414,841 S | * | 10/1999 | Krueger | D23/214 |
| 5,988,113 A | * | 11/1999 | Zhioua et al. | 119/666 |
| 6,079,640 A | * | 6/2000 | Merritts | 239/532 |
| 6,161,769 A | * | 12/2000 | Kircher et al. | 239/2.2 |
| 6,189,805 B1 | * | 2/2001 | West et al. | 239/74 |
| 6,230,660 B1 | * | 5/2001 | Greeson | 119/665 |
| 6,378,791 B1 | * | 4/2002 | Perry et al. | 239/532 |
| 6,513,458 B1 | * | 2/2003 | Burridge et al. | 119/651 |
| 6,553,941 B1 | * | 4/2003 | Porter | 119/665 |
| 6,634,435 B1 | * | 10/2003 | Saeger | 172/21 |
| 6,827,039 B1 | * | 12/2004 | Nelson | 119/604 |

FOREIGN PATENT DOCUMENTS

| | | |
|---|---|---|
| AU | 51839/79 | 4/1980 |
| AU | 75690/81 | 4/1982 |
| AU | 11123/88 | 4/1988 |
| GB | 1477836 | 6/1977 |
| GB | 2021915 A | 12/1979 |
| WO | 00/76304 A1 | 12/2000 |

* cited by examiner

POUR-ON APPLICATION METHOD AND DEVICES

TECHNICAL FIELD

The present invention relates to a method of application of pesticidal 'pour-on' formulations in respect of domestic animals, particularly sheep. The invention also relates to a device for applying such pesticidal 'pour-on' formulations; to a method for the prevention of ectoparasites and/or parasites in domestic animals and to a method for the treatment of ectoparasitic and/or parasitic infestations in domestic animals.

The term 'domestic animals' as used herein is defined to include sheep, horses, llamas, alpacas, rabbits, cats, dogs, pigs, goats and cattle. The term 'pesticidal' as used herein is defined to mean a substance for destroying pests and includes but is not limited to an ectoparasiticide, an endoparasiticide, a parasiticide, an acaricide, an insecticide, a bactericide, a fungicide, an anthelmintic agent and an antiviral agent.

BACKGROUND OF THE INVENTION

Parasites including endoparasites and particularly ectoparasites such as lice, ticks, keds, flies, fleas, mites, scab, blowfly and itch mites commonly infect sheep and cattle resulting in poor quality, damaged wool and/or hides with serious consequences to the commercial viability of such primary industry. Such ectoparasites are typically controlled by the topical application of pesticidal formulations based on such active agents as synthetic pyrethroids and organophosphates. Such methods of topical application include jetting, plunging or dipping, or spotting or pouring-on.

Pour-on formulations of pesticides or 'pour-ons' as they are commonly known, have long been used to treat or prevent ectoparasitic infestation in domestic animals, particularly sheep, simply by locally topically applying a small amount of concentrated pesticidal formulation along the backline (the spine) of the animal generally in a single unbroken band extending from behind the ears to the withers. Alternatively, such pour-on formulations can be topically applied in discrete spots, generally around the neck and ears of the animal and also on the animal's back for example at the base of its spine.

Such formulations are typically applied by brushing or rolling on, by syringing or applying with a dosing gun, by using a commercially available applicator or pump dispenser, or are simply poured onto the back of the animal, typically between the base of the neck and the base of the tail.

The mode of efficacy of the 'pour-on' application method is based on the premise that the formulation, even though applied to a small area of the animal's external body surface, spreads around the animal's entire body surface, effectively controlling ectoparasites at sites on the animal distant from the area of localised application. Accordingly, many such 'pour-on' formulations are based on particular types of carriers which are said to enhance spread of the active agent around the animal's body. It has also been put forward as a hypothesis that the active is transmitted over the surface of the animal by diffusion through the hair or wool grease (in the case of a sheep). Alternatively, it has also been postulated that the pesticidal formulations work systemically by passing through the animal's skin into its bloodstream.

However, from recent studies, it has been noted that after application of a pour-on formulation to the backline of an animal, the formulation migrates poorly from the application site and therefore largely remains concentrated in a small area of the animal's body surface, that is mainly along its back. This results in the presence of localised high amounts of pesticide residues in the animal's wool or hair which can be toxic to handlers, and also in the costly practice of applying large volumes of the pour-on formulation in an attempt to achieve its uniform distribution around the animal's body. Additionally, many of the solvent systems used in such formulations can damage the hides and skins of the treated animals, particularly when localised in concentrated amounts. Such poor mobility has been observed in commercially available pesticidal formulations applied to the backline regardless of the solvent used to enhance the spread of the formulation. Such observations have led to the speculation that the mechanism operative in the case of 'pour-ons' applied to domestic animals is not a systemic mode and nor is it one in which the carrier system determines the degree of migration of the active about the animal. However, to date, no evidence as to an alternative mode of action of pour-ons has been put forward.

OBJECTS OF THE INVENTION

It is the object of the present invention to overcome or substantially ameliorate at least one of the above disadvantages.

In particular, it is an object of the present invention to provide a device for applying a pesticidal formulation to the external surface of an animal in order to treat or prevent parasitic infestations including ectoparasitic and/or endoparasitic infestations.

It is also an object of the present invention to provide a method of treatment or prevention of parasitic infestations, including ectoparasitic and/or endoparasitic infestations, in domestic animals.

SUMMARY OF THE INVENTION

Accordingly, a first aspect of the present invention provides a device for applying a finished liquid pesticidal formulation to an external surface of a domestic animal, the device comprising an inlet and a plurality of spaced apart outlets, wherein the device is adapted such that when the middle of the device is positioned substantially above the spine of the animal, at least one outlet is positioned substantially above each flank of the animal.

The term 'finished' formulation as used herein is defined to include premixed formulations, such as from a large tank or reservoir, as well as aqueous concentrates or concentrated solutions from a wettable powder, the concentrates/solutions being held in a smaller reservoir that has an inlet for a hose to provide further water for in-line mixing. In all cases, the formulation is mixed to a final deliverable form before reaching the device.

Typically, the device includes a manifold with a substantially hollow interior and the outlets are formed as openings in the manifold that are in fluid communication with the interior. The inlet is preferably a fitting, most preferably a threaded fitting, attached to the manifold and also in fluid communication with the interior. The manifold preferably includes an outlet portion having the outlets therein and an inlet portion having the inlet thereon.

The outlets are preferably holes, preferably in the range from about 0.25 mm to 1.5 mm in diameter, most preferably 0.75 mm in diameter, drilled through the wall of the manifold. The diameter of the outlets will of course be dependent on the viscosity of the finished formulation, with liquids of low viscosity (thin oily liquids) as well as those of high viscosity (such as lotions and creams) able to be delivered through the outlets. The outlets can also be formed in the manifold by mechanical punching. Alternatively, the outlets are fan jets or other types of spray nozzles, which are preferably screwed into the manifold. The nozzles can be formed from metal, such as brass or other materials, such as plastic.

In one form, the manifold is formed from straight pipe, preferably with sealed ends. The manifold is preferably formed from steel, most preferably stainless steel. Other materials, such as plastic and brass, can also be used.

In another form, the manifold is bent, curved or angled to substantially replicate the shape of an animal's back between its flanks.

In yet another form, the manifold is length adjustable. The length adjustable manifold preferably includes a female portion threadably connected to a male portion, whereby relative rotation of the male portion relative to the female portion alters the overall length of the manifold. Preferably, the length adjustable manifold includes a female inner portion with a male outer portion at each end. A single outlet is preferably provided in the female inner portion and a pair of outlets are preferably provided in each of the male outer portions. The outer portions also desirably include a knurled section for gripping. The length adjustable manifold preferably permits the minimum and maximum distances between end outlets to be adjusted between 100 mm and about 900 mm respectively, as such maximum distance may be required when using the device to apply a finished formulation to a dairy cow of about 600–700 kg and such a minimum distance may be required when using the device to apply a formulation to a cat or dog. When using the device on sheep and goats more preferably the minimum and maximum distances between end outlets can be adjusted between 100 mm and about 200 mm.

The manifold preferably includes at least three outlets. When three outlets are used it is preferable for, when the device is positioned substantially above the spine of the animal, one outlet to be positioned substantially above the spine of the animal and one outlet to be positioned substantially above each flank of the animal.

Between three and seven outlets are preferably used, most preferably five outlets.

The manifold desirably includes a pair of outlets adjacent the ends of the manifold and one or more outlets immediate the end outlets.

In preferred forms, the spacing (in mm) between successive outlets from one end of the manifold to the other are approximately: 15, 15, 15, 15, 15, 15; 20, 50, 50, 20; 20, 60, 20, 60, 20; 20, 60, 60, 20; or 40, 75, 75, 40. Longer manifolds, and larger spacing, can be used for larger animals.

The preferred minimum and maximum distances between end outlets are 100 mm and 900 mm respectively, more preferably the minimum and maximum distances are 100 mm and 600 mm respectively, also preferably the minimum and maximum distances are 100 mm and 400 mm respectively. Such maximum distances ensure that the device can be used on cattle of various sizes, horses llamas, alpacas and pigs. When using the device on sheep and goats the preferred minimum and maximum distances between end outlets are 100 mm and 200 mm respectively, more preferably the optimal distance when using the device on sheep and goats being selected from the group consisting of 150, 160, 170 and 180 mm. When using the device on a dog or cat, the optimal distance may be slightly less, such as in the order of 100, 120 or 130 mm, depending on the size of the animal.

While not intending to be limited by theory in any way, the present invention is based on the discovery that the more even the distribution of the active agent at the time of application, the greater is the chance of achieving a high degree of control of parasites, particularly ectoparasites, on domestic animals. Experiments conducted by the present applicant which are discussed in the 'Examples' section below, show that in sheep treated with four different formulations of zeta-cypermethrin by means of the standard 'pour-on' backline application, with each sheep then being isolated, there is little movement of the active beyond 2 cm from the point of application even fourteen (14) days after application. It is therefore speculated that the effectiveness of pour-ons to date is in the main due to inter-animal contact and also physical contact with other objects which animals often rub against such as fence posts and trees.

Accordingly, a second aspect of the present invention provides a method for the treatment or prophylaxis of parasitic infestations, including ectoparasitic and/or endoparasitic infestations, of domestic animals comprising topically administering to said animal a pour-on pesticidal formulation to a region of the external surface of an animal extending from one flank to the opposing flank.

One embodiment of the second aspect of the present invention provides a method for the control of external parasites on domestic animals which comprises a topical application of an effective amount of a pesticidal formulation to a region of the external surface of an animal extending from one flank to the opposing flank.

A third aspect of the present invention provides the use of an endoparasiticide and/or ectoparasiticide for the preparation of a pesticidal formulation for the treatment or prophylaxis of parasitic infestations, including ectoparasitic and/or endoparasitic infestations, of domestic animals comprising topically administering to said animal said formulation to a region of the external surface of an animal extending from one flank to the opposing flank.

A fourth aspect of the present invention provides a pesticidal formulation when used in the treatment or prophylaxis of parasitic infestations, including ectoparasitic and/or endoparasitic infestations, of domestic animals comprising topically administering to said animal said formulation to a region of the external surface of an animal extending from one flank to the opposing flank.

Typically, the wider the region of the animal's surface covered by the application, the more effective is the pour-on pesticidal formulation as it can then run down the flanks of the animal. Such a region typically covers the backline of the animal and extends outwards from the backline towards each flank. This is in contrast with the prior art method of applying a pour-on to the backline of an animal as the dorsal midline or backline area is substantially horizontal and therefore does not allow for movement of the formulation under gravity. In the present invention, because the application of the pesticidal formulation occurs at a width covering the flanks of the animal, this enables the natural force of gravity to act such that the formulation migrates down the flanks of an animal so treated thus resulting in a good migratory effect of the formulation. Alternatively, the use of pressurised application of the pesticidal formulation allows the formulation to be sprayed onto the flanks of the animal.

Typically in the case of sheep or goats, the area to which the formulation is applied covers approximately 100 to 200 mm on each side of the backline (or dorsal midline) towards the ventral midline.

More typically in the case of sheep and goats, the width of the region covered by the application of the pour-on is between about 100 mm and 400 mm, more typically the width is selected from the group consisting of about 140 mm, about 160 mm, about 180 mm or about 200 mm.

Typically in the case of cattle and horses the area to which the formulation is applied covers approximately 100 to 400 mm on each side of the backline (or dorsal midline) towards the ventral midline.

More typically in the case of cattle and horses, the width of the, region covered by the application of the pour-on is between about 100 mm and 800 mm, more typically the width is selected from the group consisting of about 400 mm, about 500 mm, about 600 mm or about 700 mm.

Typically in the case of pigs the area to which the formulation is applied covers approximately 100 to 400 mm on each side of the backline (or dorsal midline) towards the ventral midline.

More typically in the case of pigs, the width of the region covered by the application of the pour-on is between about 100 mm and 400 mm, more typically the width is selected from the group consisting of about 100 mm, about 200 mm, about 300 mm or about 400 mm.

Typically in the case of dogs and cats the area to which the formulation is applied covers approximately 50 to 200 mm on each side of the backline (or dorsal midline) towards the ventral midline.

More typically in the case of dogs and cats, the width of the region covered by the application of the pour-on is between about 40 mm and 400 mm, more typically the width is selected from the group consisting of about 60 mm, about 120 mm, about 200 mm or about 300 mm.

Typically, the formulation is applied simultaneously to the external surface of an animal which is bounded by its flanks (or the equivalent body region). Typically, the formulation is not applied to the entirety of the region of the animal bounded by its flanks or extending across the width at the sacrum. More typically, the formulation is applied in discrete substantially parallel lines in the region of the animal external body surface which is bounded by its flanks and more typically the lines are parallel to the spine of the animal. It is also typical that such substantially parallel lines of formulation are applied simultaneously within the region of the animal extending from one flank to the opposing flank. This concept of 'simultaneous application' is important as one single application of the formulation will effectively cover the required area of the animal's body sought to be treated, rather than a multitude of separate single applications.

More typically at least one line of applied formulation is substantially along the backline of the animal, with at least two other substantially parallel lines of simultaneously applied formulation extending down the length of the animal's body at the width across the flanks of the animal.

Typically this region extending from one flank to the opposing flank can also be described as the region extending down the backline of the animal but having a width which is the width of the animal's sacrum or alternatively, the mid side width of the animal at the level of the $10^{th}/11^{th}$ rib. This area is therefore typically covered by parallel lines of formulation which are applied simultaneously to the whole area.

Typically, the domestic animal is selected from the group consisting of sheep, cattle, horses, llamas, alpacas, rabbits, cats, dogs, pigs or goats. More typically, the animal is a sheep, cow, pig or goat.

Typically, the ectoparasites include, but are not limited to members of the Arthropoda order Diptera, Phthiraptera and Acarina and parasites and other insects which are parasitic during all of their life cycle or only part of their lifecycle, such as only the larval or adult stage.

More typically, the ectoparasites include blowfly, lice, ked, mites, itch mite, scab, screw worm, bot flies, ticks, fleas and related arthropod pests.

Typically, the active agents used in the formulations applied in the methods of the present invention are commercially available and include insect growth regulators such as diflubenzuron, triflumuron and cyromazine; organophosphates including diazinon, fenchlorphos, chlorpyrifos, dichlorvos, malathion; amitraz; synthetic pyrethroids including flumethrin, deltamethrin, cypermethrin, phenothrin, cyfluthrin, tralomethrin, permethrin; amidines, carbamates, rotenone; ivermectin and other macro cyclic lactones including moxidectin; avermectin, doramectin and eprinomectin; tetramisole; levamisole and spinosyns.

Also typically, formulations which can be used in the present invention can be any agricultural chemical based formulations, more typically such formulations can take any one of the following forms: solutions being organic solvent based such as fatty acid esters, emulsifiable concentrates based on solvents such as high aromatic naptha or organic solvents such as fatty acids, suspension concentrates, wettable powders, water dispersible granules, microemulsions, lotions and aqueous solutions.

Typically, a 'pour-on' is applied to sheep immediately after shearing.

Typically, any animal treated according to the present invention is yarded with other animals for at least a day after the treatment in order to ensure physical contact between the animals and thereby maximise movement of the active.

More typically, the treated animals are yarded together for a time period between 1 day to 5 days, more typically 3 days in order to ensure physical contact between them.

In another embodiment of the second aspect of the present invention, there is provided a method for the control of endoparasites on domestic animals which comprises a topical application of an effective amount of a finished pesticidal formulation to a region of the external surface of an animal extending from one flank to the opposing flank.

Topical 'pour-on' application of parasiticides for the control of endoparasites is well known and is thought to act systemically via absorption of the parasiticide through the skin or hide of the animal.

Typically, such endoparasites include nematodes and helminths such as heartworm, lungworm, roundworm, hookworm and whipworm.

More typically, such endoparasites include:

i) Endoparasites in horses including:

*Parascaris equorum, Habronema* spp., *Strongylus* spp., *Oxyuris equi, Gastrophilus* spp., *Trichonema* spp., *Triodontophorus* spp., *Strongyloides westeri, Habronema* spp.

ii) Endoparasites in sheep and goats including

*Paramphistomum* spp., *Monezia* spp., *Haemonchus contortus, Trichostrongylus* spp., *Ostertagia* spp., *Cooperia* spp., *Nematodirus* spp., *Oesophagostomum* spp., *Chabertia ovina, Trichuris* spp., *Fasciola* spp., *Muellerius capillaris, Dictyocaulus* spp., *Oestrus ovis.* iii) Endoparasites in cattle including

*Paramphistomum* spp., *Monezia* spp., *Haemonchus*spp., *Trichostrongylus* spp., *Ostertagia* spp., *Cooperia* spp., *Nematodirus* spp., *Bunostomum phlebotomum, Stronyloides papillosus,*

*Oesophagostomum* spp., *Chabertia ovina*, *Trichuris* spp., *Fasciola* spp., *Schistosoma* spp., *Muellerius capillaris*, *Dictyocaulus* spp., *Oestrus ovis*.

iv) Endoparasites in pigs including

*Ascaris suum*, *Strongyloides* spp., *Trichinella spiralis*, *Trichuris suis*, *Oesphagostomum* spp., *Schistosoma* spp., *Paragonimus* spp., *Metastrongylus* spp.

v) Endoparasites—helminths in dogs and cats including *Spirometra* spp., *Taenia* spp., *Echinococcus granulosus*, *Diplopylidium* spp., *Toxacsaris leonina*, *Toxocara* spp., *Stongyloides* spp., *Ancylostoma* spp., *Uncinaria stenocephala*, *Necator americanus*, *Trichuris* spp., *Spirocerca* spp., *Schistosoma* spp., *Dirofilaria immitis*, *Brugia* spp., *Capillaria plica*, *Paragonimus* spp., *Aelurostrongylus* spp., *Filaroides* spp., *Lingualuta serrata*, *Dipetalonema* spp.

More typically, a pesticidal 'pour-on' formulation of the present invention acts to control ked (*Melangophagus ovinus*), biting louse (*Bovicola ovis*), sucking louse (*L. Pedalis, Linognathus ovillus, L. Africanus, L. Stenopsis*), sheep scab mite (*Psoroptes ovis*), itch mite (*Psorergates ovis*), mange mite (*Chorioptes ovis*), screw worms, ticks (*Boophilus* spp. *Ixodes* spp. *Haemophlysalis* spp. *Ambylomma* spp. *Dermacentor* spp. *Hyalomma* spp. *Rhipicephalus* spp) bot flies (*Oestrus ovis*) and blowflies (*Lucilia, Calliphora, Chrysomyia* spp.) in sheep, acts to control biting louse (*D. limbata, D. crassipes, D. caprae*) and sucking louse in goats, acts to control biting lice (*Bovicola breviceps*) in camelids, acts to control sucking louse (*Linognathus vituli, Haematopinus eurysternus, Solenopetes capillatus*) and biting louse (*Bovicola bovis*) on catttle as well as flies (eg *Musca domestica, Haemlatobia irritrans, Stomoxys calcitrans*), screw worms (*Chrysomya bezziana, Callitroga hominivorax*), midges, mosquitos, mites (*Chorioptes bovis, Sarcoptes bovis, Psorpotes ovis, Demodex bovis*), and ticks (*Boophilus* spp, *Ixodes* spp, *Haemophysalis* spp, *Amblyomma* spp, *Dermacentor* spp. *Hyalomma* spp, *Rhipicephalus* spp, *Otobius megnini*), acts to control ticks, mites (*Choriptes equi, Psoroptes equi, Sarcoptes equi, Demodex equi*), lice (*Damalinia equi, Haematopinus asini*), fleas, Dipterida (*Culicoides* spp, *Simulium* spp and other flies) in horses and acts to control ticks, mites (including *Sarcoptes suis, Demodex suis*), lice, fleas and Dipteridia in pigs.

Active endoparasiticides typically include the anthelmintics tetramisole and its laevo isomer levamisole.

Typically the pesticidal formulation is applied as stated above in respect of the treatment of external parasites, namely it occurs at a width covering the flanks of the animal, this enables the natural force of gravity to act such that the formulation migrates down the flanks of an animal so treated thus resulting in a good migratory effect of the formulation.

Again, while not wishing to be bound by theory, it is postulated that such methodology of so applying the pesticidal formulation in an area across the back of the animal from one flank to the other, increases the rate of absorption or quantity of active migrating through the skin. The larger the surface area covered by the formulation, the greater should be the absorption through the skin and the more effective the elimination of endoparasites.

BRIEF DESCRIPTION OF THE DRAWINGS

Preferred forms of the present invention will now be described, by way of examples only, with reference to the accompanying drawings in which.

DETAILED DESCRIPTION OF THE PREFERRED EMBODIMENTS

Figure 1:
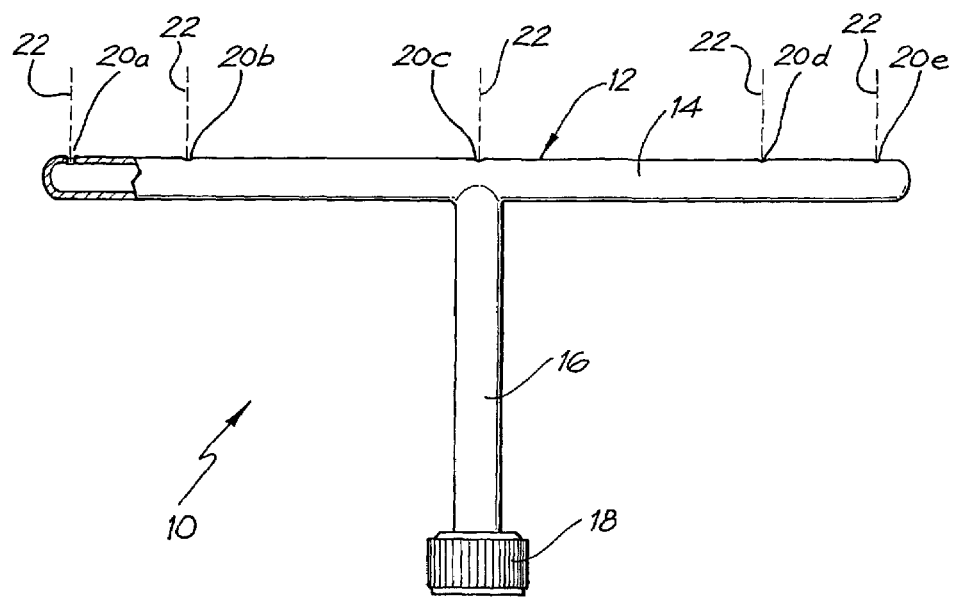
FIG. 1 is a schematic, front view of a first embodiment of a device for applying a finished liquid pesticidal formulation to an external surface of a domestic animal.

FIG. 1 shows a schematic, front view of a first embodiment of a device 10 for applying a finished liquid pesticidal formulation to an external surface of a domestic animal. The device 10 is preferably manufactured from stainless steel and includes a manifold 12 formed from an outlet pipe 14 and an inlet pipe 16. A threaded inlet fitting 18 is attached to the inlet pipe 16. The fitting 18 permits connection to a pressurised source of the liquid pesticidal formulation, such as a dosing gun or other commercially available applicator or pump dispenser.

The outlet pipe 14 has five liquid pesticidal formulation outlets 20a, 20b, 20c, 20d and 20e, which are each respectively spaced apart from adjacent outlets by 20 mm, 50 mm, 50 mm and 20 mm. The outlets 20a to 20e are 0.75 mm diameter holes drilled through the wall of the hollow outlet pipe 14.

The inlet pipe 16, the outlet pipe 14 and the fitting 18 are all hollow and in fluid communication with each other. Accordingly, when the liquid pesticidal formulation is forced through the fitting 18 it travels through the inlet pipe 16 to the outlet pipe 14 and so out the outlets 20a to 20e, as indicated by dashed lines 22.

In use, the device 10 is positioned with the middle outlet 20c substantially above the spine of an animal, which has the effect of positioning the outermost outlets 20a, 20b, 20d and 20e substantially above the flanks of the animal.

Movement of the device along the animal from its neck down its backline to its tail base delivers the pesticidal formulation from the outlets of the device onto the external surface of the animal in the region bounded by the external outlets of the device and effectively results in coverage of an area from one flank of the animal to its other flank by the formulation. The formulation applied via the outlets of the device can migrate to a small degree from the sites of application and can dribble down the flanks of the animal.

Figure 2:
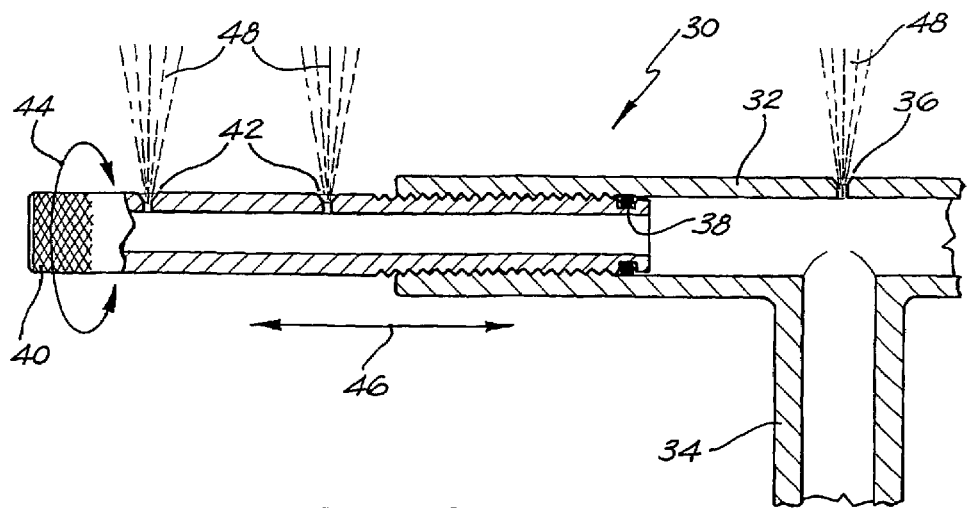
FIG. 2 is a partial, schematic, cross sectional, front view of a second embodiment of a device for applying a finished liquid pesticidal formulation to an external surface of a domestic animal.

FIG. 2 shows a partial, schematic, cross sectional, front view of a second embodiment of a device 30 for applying a finished liquid pesticidal formulation to an external surface of a domestic animal. Similar to the first embodiment of the device 10, the device 30 includes a manifold formed from an outlet pipe 32 and an inlet pipe 34. However, the outlet pipe 32 is length adjustable by virtue of it being constructed from a female inner portion 32a to which are threadably connected a pair (only one shown) of male outer portions 32b.

The inner portion 32a includes a single tapered or 'fan jet' outlet 36. The inner end of the outer portions 32b includes an O-ring seal 38 against the interior of the inner portion 32a. The outer end of the outer portions 32b includes a knurled section 40 to enhance gripping of same and a pair of fan jet outlets 42.

Relative rotation of the outer portions 32b relative to the inner portions 32a, as indicated by arrow 44, allows the overall length of the outlet pipe 34 (and thus the distance between the outlets 36 and 42) to be adjusted, as indicated by arrow 46, to suit the particular size of animal being treated.

In use, similar to the first embodiment, the outlet 36 is positioned substantially above the spine of an animal, and the length of the outlet pipe 34 is adjusted to position the outlets 42 substantially above the flanks of the animal. In the embodiment shown, the distance between the outermost or end outlets 40 is adjustable between 100 and 200 mm. As with the first embodiment, when the liquid pesticidal formulation is forced through the inlet pipe 34 it travels to the outlet pipe 32 and so out the outlets 36 and 40, as indicated by fanned lines 48.

Figure 3:
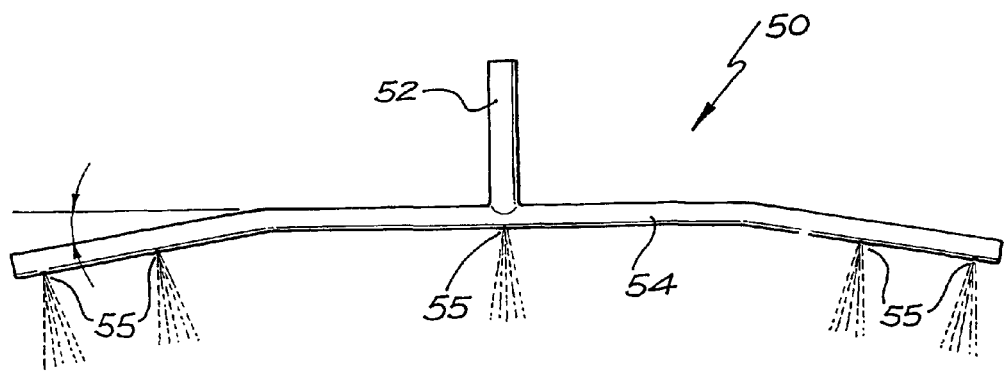
FIG. 3 is a schematic, front view of a third embodiment of a device for applying a finished liquid pesticidal formulation to an external surface of a domestic animal.
Figure 4:
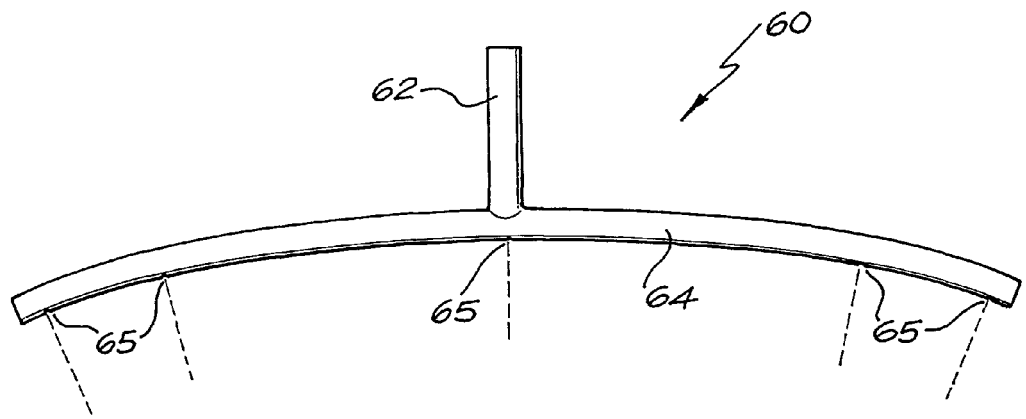
FIG. 4 is a schematic, front view of a fourth embodiment of a device for applying a finished liquid pesticidal formulation to an external surface of a domestic animal.
Figure 5:
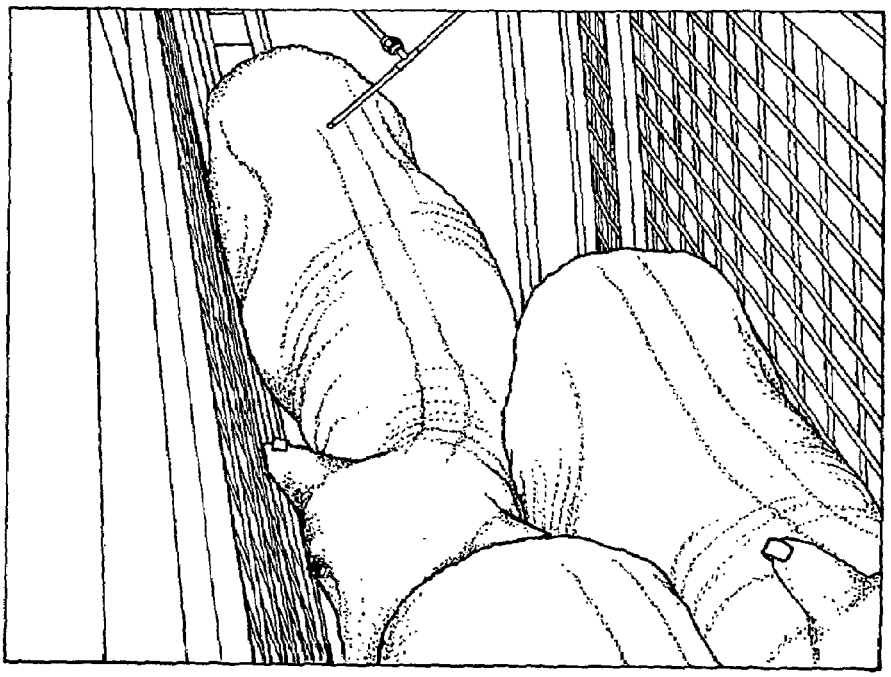
FIG. 5 is a photographic representation of the application of a finished pesticidal pour on formulation to a shorn sheep using an embodiment of a device according to the present invention.
Figure 6:
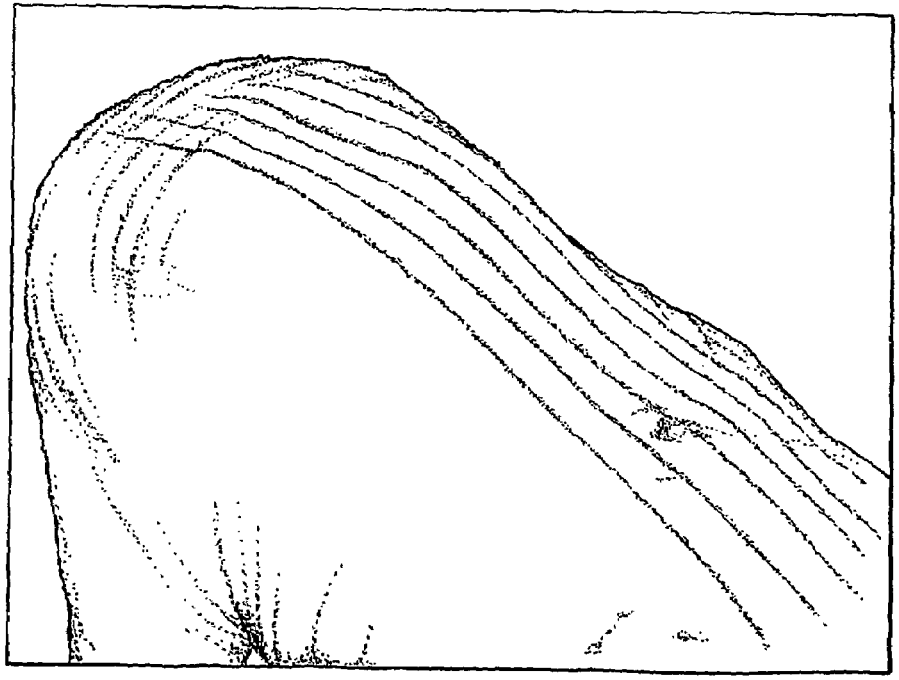
FIG. 6 is a photographic representation of the dorsal and flank area of a sheep which has been treated according to an embodiment of the method of the present invention.
Figure 7A:
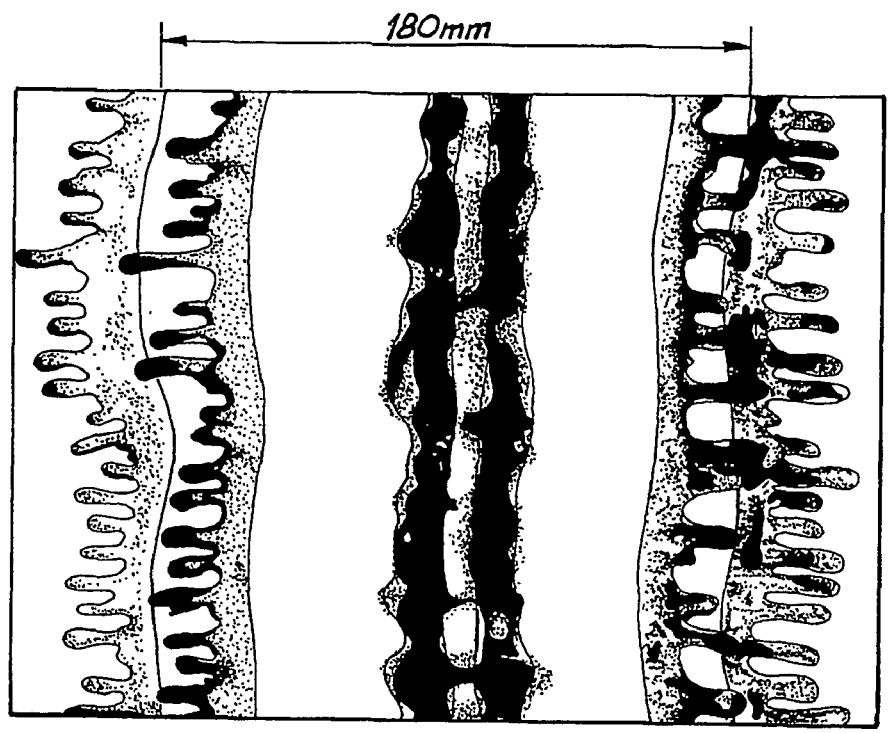
FIGS. 7A and 7B are representations of the substantially parallel lines (bandwidth patterns) which result along the length of the sheep's spine in the area bounded by its flanks following treatment in accordance with one embodiment of the invention.
Figure 7B:
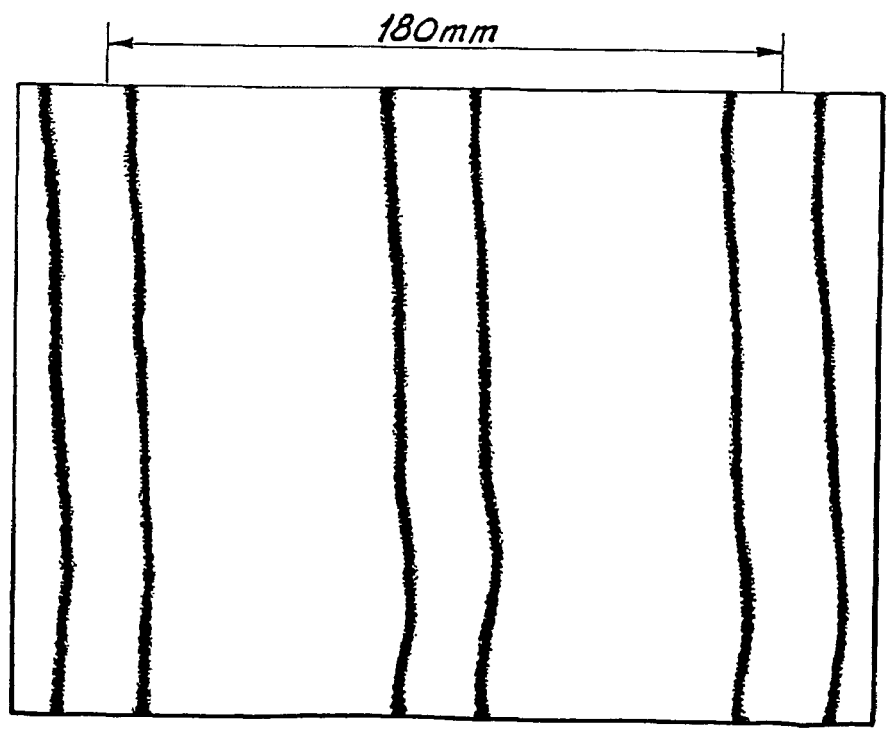

FIGS. 3 and 4 show schematic, cross sectional, front views of third and fourth embodiments of a device 50 and 60 for applying a finished liquid pesticidal formulation to an external surface of a domestic animal. Similar to the first embodiment of the device 10, the devices 50 and 60 includes a manifold formed from an outlet pipe 52,62 and an inlet pipe 54, 64. However, the outlet pipe 52 is bent at the ends (by about 10 degrees), and the outlet pipe 62 is curved, to substantially replicate the shape of the animal's back.

In these embodiments, the spacing (in mm) between successive (0.75 mm diameter) outlets 55, 65 from one end of the manifold to the other is approximately: 20, 60, 60, 20.

Figure 8A:
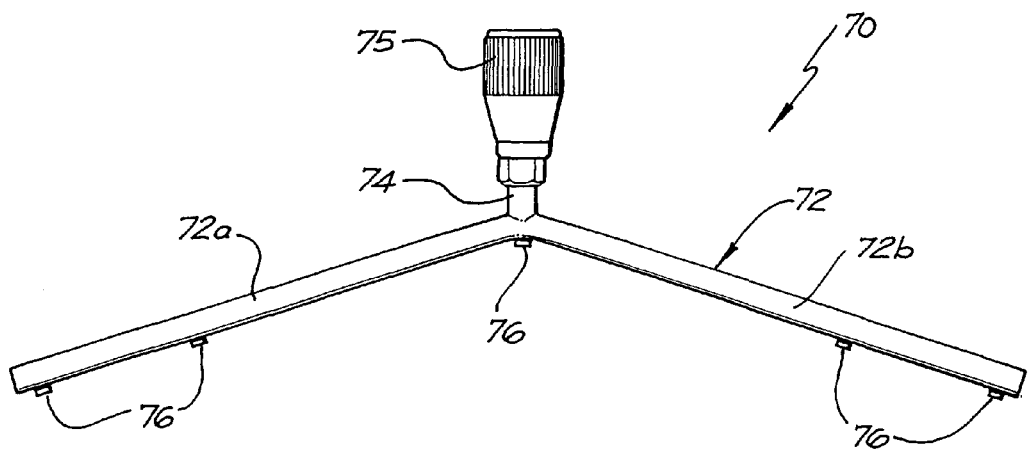
FIGS. 8A and 8B are front and underside views respectively of a fifth embodiment of a device for applying a finished liquid pesticidal formulation to an external surface of a domestic animal.
Figure 8B:
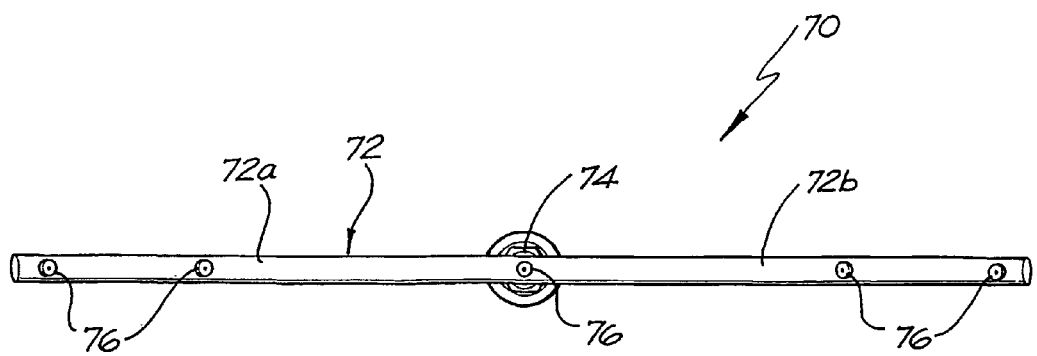
Figure 9:
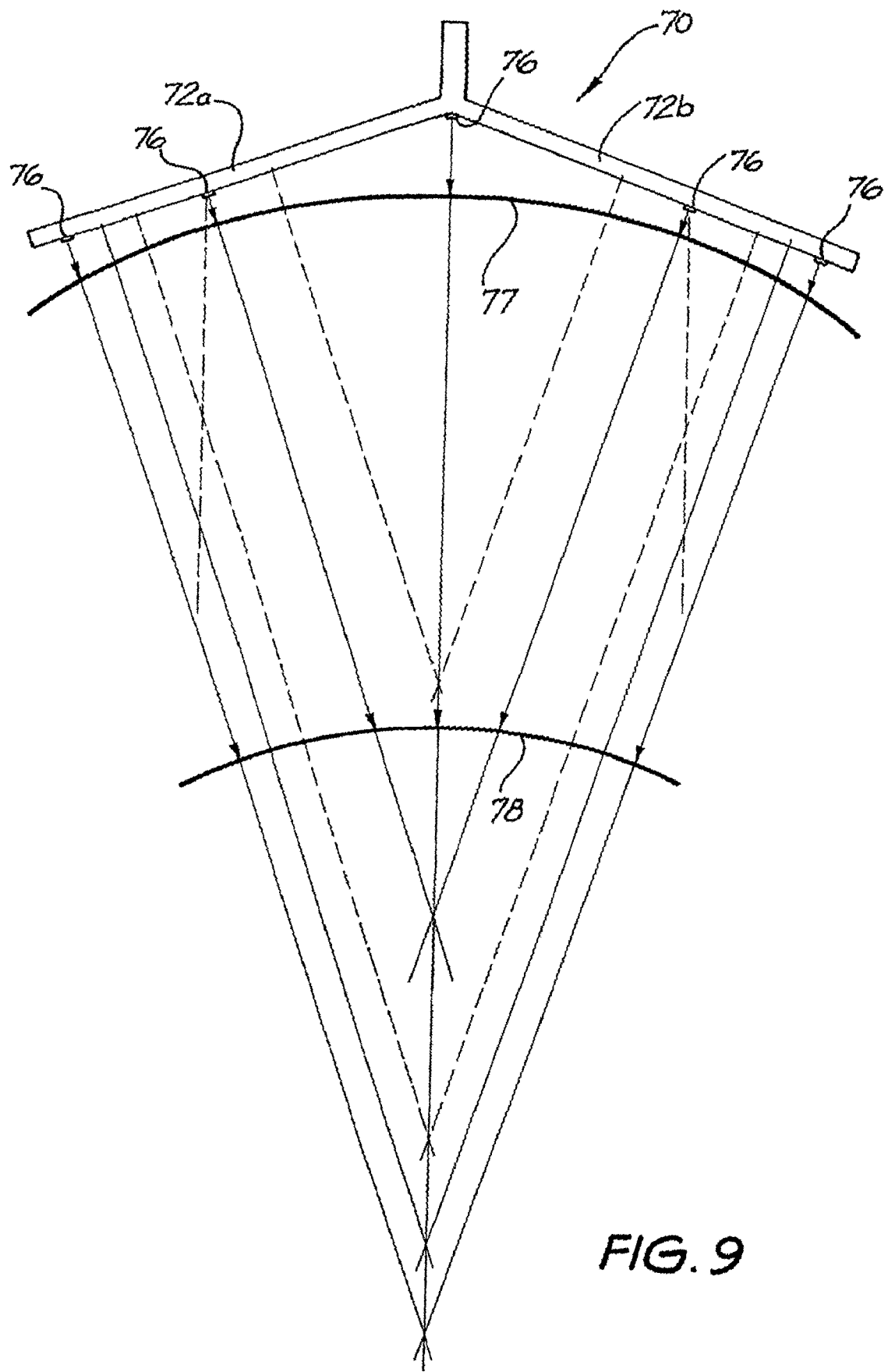
FIG. 9 is a schematic side view showing positioning of the device shown in FIGS. 8A and 8B relative to a larger and a smaller animal.

FIGS. 8A and 8B respectively show front and underside views of a fifth embodiment of a device 70 for applying a finished liquid pesticidal formulation to an external surface of a domestic animal. Similar to the third and fourth embodiments of the device 50 and 60, the device 70 includes a manifold formed from an outlet pipe 72 and an inlet pipe 74 with a connecting fitting 75. The outlet pipe 72 includes two angled outlet pipe portions, 72a and 72b, to substantially replicate the shape of the animal's back. In this embodiment, the spacing (in mm) between successive (0.75 mm diameter) outlets 76 from one end of the manifold to the other is approximately: 40,75,75,40.

The bent/curved/angled outlet pipes of the devices 50, 60 and 70 are designed to replicate the shape of the animal. Accordingly, with a low viscosity pesticidal formulation and small fan nozzles at each of the orifices the material will be sprayed on to the flanks of the animal, thus giving wider distribution on application. With heavier, is more viscous formulations, the straight outlet pipe is typically used because such formulations cannot be pushed out under pressure to form a fan pattern. The formulation will simply fall from the orifices in the outlet pipe substantially vertically onto the animal's back and flanks. In both cases, backline and flank application will be made.

FIG. 9 shows the preferred positioning of the device 70 relative to a larger animal 77 (eg. 35 kg sheep) and a smaller animal 78 (eg. 15 kg sheep). The distance between the device 70 and the animal is inversely proportional to the animal's size in order to ensure the formulation is directed to the animal's backline.

FIGS. 5 and 6 show substantially parallel lines resulting along the dorsal and flank area of a sheep which has been treated according to an embodiment of the method of the present invention using an embodiment of a device according to the present invention.

The external surface of the sheep which has been treated, extends across the dorsal midline in a width of about 180 mm from one flank of the sheep to the other flank. A single application of a device according to one embodiment of the present invention covers such area simultaneously delivering pesticidal formulation in the form of substantially parallel lines.

FIGS. 7A and 7B again show the substantially parallel lines (bandwidth patterns) which result along the length of the sheep's spine in the area on either side of the dorsal midline bounded by its flanks following treatment where one embodiment of the device of the present invention delivers a pesticidal formulation from end outlets which are a distance of about 180 mm apart.

The method of treatment or prophylaxis of ectoparasitic and/or parasitic infestations in domestic animals according to the present invention is now further described with reference to the following non-limiting examples.

EXAMPLES

Example 1

Objectives: To determine the effect of application band width and stocking density on spinosad pour-on efficacy for control of lice in sheep immediately off-shears.

Treatments: All sheep were treated with spinosad at 16 mg/sheep (equivalent to 0.4 mg/kg live weight). This dose was chosen at approximately 1/20 of the fill efficacious dose to allow discrimination between treatments. Treatments were applied using either a band width of 30 mm or 180 mm. Sheep were kept in pens either alone or in groups of 6. Lice counts were made on days 0, 14, 28, 42 and 56 days after treatment.

Design: Four (4) treatment groups of sheep were used in this trial comprising the 2×2 factorial combinations of a route of application factor (backline (B) or backline plus flank (BF)) and a grouping factor (grouped in pens of 6 sheep (G) or single pens (S)). There were 2 group pens and 6 single pens for each of the B and BF treatments, so twice as many sheep in groups as in single pens. There was also a control group of 6 sheep in single pens. The sets of 6 sheep in each treatment and group pen and the control were balanced for initial lice counts, so that each such group commenced the trial with counts that had similar means and ranges.

Statistical analyses: The method of generalised linear models for overdisposed Poisson data using a logarithmic link function was used to analyse the lice counts at each sampling. Two contrasts between treatments (BF-B for route and S-G for grouping) and their interaction (BF-BxS-G) were assessed in each analysis. The logarithm of initial counts was used as a covariate to reduce residual variation, but was not used to calculate adjusted means. The covariate was significant throughout the trial (P<0.05, at least). In an initial analysis for each sampling, random pen effects were included in the model to check for the presence of correlation among counts for sheep within groups, but as no pen effects were detected on any occasion, they were ignored in subsequent analyses.

Results: The route contrast BF-B was significant and negative on days 14, 28 and 42 (P<0.05, 0.01, 0.05 respectively) and thereafter was significant at the 10% level (P<0.06 on day 56, P<0.09 on day 70). Although the magnitude of the contrast on days 56 and 70 was similar to that for day 28, the variability among counts was higher. On each occasion mean lice counts were lower for the BF treatment than the B treatment. The grouping contrast S-G was significant and positive from days 28 to 70 (P<0.01, 0.01, 0.05, 0.05 respectively). On each occasion, mean lice counts for G were lower than for S. The interaction BF-B × S-G was negligible on each occasion.

Tabulated below are the route and grouping contrasts at each sampling (on the log scale) with standard errors, together with mean counts for the treatment and control groups and % efficacy estimates in parentheses for the treatments relative to the control group.

|  | Day 14 | Day 28 | Day 42 | Day 56 | Day 70 |
| --- | --- | --- | --- | --- | --- |
| Contrast | | | | | |
| BF-B | −0.286 ± 0.130 | −0.467 ± 0.150 | −0.660 ± 0.254 | −0.504 ± 0.257 | −0.490 ± 0.279 |
| S-G | 0.099 ± 0.085 | 0.260 ± 0.090 | 0.408 ± 0.143 | 0.368 ± 0.155 | 0.365 ± 0.169 |
| Mean Counts | | | | | |
| Control | 659.0 | 707.8 | 725.8 | 756.7 | 743.7 |
| B, G | 60.8 (90.8) | 30.9 (95.6) | 17.5 (97.6) | 16.1 (97.9) | 27.7 (96.3) |
| BF, G | 25.8 (96.1) | 8.9 (98.7) | 3.4 (99.5) | 5.9 (99.2) | 5.7 (99.2) |
| B, S | 63.7 (90.3) | 57.7 (91.8) | 54.2 (92.5) | 48.7 (93.6) | 65.8 (91.2) |
| BF, S | 52.8 (92.0) | 29.2 (95.9) | 17.0 (97.7) | 17.7 (97.7) | 34.2 (95.4) |

Example 2

Objectives: To compare the amount and rate of diffusion of $^{14}C$ labelled zeta-cypermethrin from the dorsal midline of sheep when applied in a conventional formulation and a range of test excipients.

| Animal Description: | |
| --- | --- |
| Animal: | Sheep |
| Breed/Strain: | Merino |
| Sex: | Castrate male or female |
| Description: | 5 months plus wool, all of the same genetic line, plain bodied |
| History: | No synthetic pyrethroid treatment in the previous 3 months. A solid vaccination history is essential. Internal parasites must be controlled. |
| Age: | Mature |
| Weight: | Less than 50 kg |

Study Design and Animal Allotment

Treatments: 10 mg/ml zeta-cypermethrin spiked with 100 μCi zeta-cypermethrin labelled with $^{14}C$ in an emulsifiable concentrate, Greenfield solvent based pour-on formulations 1, 2 and 3 (groups 1,2,3,4 in "drug formulations").

Design: 3 sheep per treatment group, 4 groups=12 sheep. Sheep were randomly to allocated to each treatment group.

Trial Facilities

Animals were acclimatised to the diet and housed in metabolism crates for 1 week prior to treatment. On day 0 sheep were removed from their cages, shorn, weighed, treated and returned to individual metabolism crates in order to restrain each sheep until conclusion of the test. The sheep were shorn using an electric shearing machine on the same day as the treatment.

Drug Formulations

Group 1–100 mg/ml zeta-cypermethrin in a conventional EC formulation, was spiked with 100 μCi $^{14}C$-labelled zeta-cypermethrin. The EC was diluted 1:10 in water and the resulting emulsion applied to deliver 10 mg/ml zeta-cypermethrin.

Group 2–10 mg/ml zeta-cypermethrin in Greenfield formulation I pour-on vehicle was spiked with 100 μCi $^{14}C$-labelled zeta-cypermethrin.

Group 3–10 mg/ml zeta-cypermethrin in Greenfield formulation II pour-on vehicle was spiked with 100 μCi $^{14}C$-labelled zeta-cypermethrin.

Group 4–10 mg/ml zeta-cypermethrin in Greenfield formulation III pour-on vehicle was spiked with 100 μCi $^{14}C$-labelled zeta-cypermethrin.

Administration

The sheep were shorn immediately prior to treatment and marked along the dorsal midline with a waterproof pen. Parallel horizontal lines were drawn on the left and right sides of the sheep 2, 7.5 and 15 cm from the dorsal midline towards the ventral midline. The meridians were marked with a series of dots or a line and the measurements were made using a tape measure.

1 ml of test article per 5 kg body weight was applied evenly along the dorsal midline from the withers to the tail base. This was achieved using a syringe delivering a fine constant spray of each test article formulation. Any obvious runs of test article down an animal's back were marked to be avoided at sampling.

Sampling Procedure

At 1, 2, 4, 8, 11 and 14 days after treatment, wool was clipped from 3 12×12 mm squares chosen at random along each meridian. Samples were taken from the 15 cm meridian first, followed by the 7.5 cm meridian and finally from the 2 cm meridian. Wool samples from each left and right pair of meridians were pooled and placed into a preweighed, labelled scintillation vial. Swabs from each pair of meridians were pooled. From each animal on each sampling day the following samples were taken:
- 3 wool samples from each 15 cm meridian pooled;
- 3 wool samples from each 7.5 cm meridian pooled;
- 3 wool samples from each 2 cm meridian pooled;
- 3 clipped sites, 3 swab samples from each 15 cm meridian pooled;
- 3 clipped sites, 3 swab samples from each 7.5 cm meridian pooled;
- 3 clipped sites, 3 swab samples from each 2 cm meridian pooled.

At day 14 after treatment all wool from the midline was collected and placed in several scintillation vials. The bare skin was swabbed using a piece of gauze soaked in solvent and the gauze was then placed in a vial.

Results

Group 1: Zeta+Emulsifiable Concentrate (EC)

Results are set out in Table 1. The three sheep in this group were sheep 431, sheep 171 and sheep 103. This formulation contains about 10% solvent which has a relatively high boiling range and a distinct strong odour.

Sheep 431: All the values obtained from sheep 431 were included in the final calculations. This sheep gave higher levels than the other 2 sheep in this group particularly at the 2 cm meridian.

Sheep 171: On day 5 this sheep was found out of its crate. The front 1.5 cm of the backline treatment had been smudged. On day 4 the 2 cm meridian sample had a very high level most likely caused by a formulation run at the time of application and this sample was excluded.

Sheep 103: This sheep had 2 small runs of formulation. The 2 cm meridian wool samples for days 1, 11 and 14 were contaminated by runs and were excluded.

Overall the backline remained intact for this group.

Group 2: Zeta+Greenfield I

Results are set out in Table 2. The three sheep in this group were sheep 290, sheep 609 and sheep 108. This formulation contained a solvent/oil which stripped the grease from the backline to form a white bleached area at the treatment site. The skin at the backline formed a thick hard layer.

Sheep 290 and 609: These sheep had either smudging or rubbing after day 2. The formulation appeared to spread well because of its ability to dissolve grease and move strongly to the 2 cm meridian and beyond. However, due to its effect on the skin and bleaching of the wool, the formulation was considered unsuitable and resalts were not included in the final calculations.

Results from sheep 108 showed a high retention in the 2 cm zone.

Group 3: Zeta+Greenfield II

Results are set out in Table 3. The three sheep in this group were sheep 649, sheep 030 and sheep 119. The formulation contained a strong solvent/oil which attacked the rubber in the syringe.

Sheep 649: This formulation exchanged well with the grease and moved rapidly to the 2 cm meridian. Samples from this line had a very high count but lower levels were obtained from the other meridians. This may be attributed to the solvent vehicle which facilitated the dispersion of zeta to the 2 cm meridian but after apparent solvent evaporation there was little additional movement. On day 8 there was rubbing close to the upper meridian which may have affected the levels found in the wool samples after that day.

Sheep 030: On day 4 the front 5 cm of the backline appeared to be smudged and after this day extremely high counts were observed at the 2 cm meridian. From day 4 the 7.5 and 15 cm meridians appeared to have extremely high counts compared to the other 2 sheep in this group. Smudging would appear to be the most likely cause of this apparent spread. The 15 cm meridian samples for days 8–14 and samples from the 7.5 cm meridian for days 4–14 were ignored.

Sheep 119: On day 4 a smudge was observed in the front 2–5 cm of the backline. Except for days 1 and 2, the 2 cm meridian samples gave very high concentrations which were inconsistent with the very low levels obtained for the other 2 meridians. Day 14 values were excluded as the levels of zeta seemed to be contaminated.

Group 4: Zeta Greenfield III

Results are set out in Table 4. The three sheep in this group were sheep 316, sheep 611 and sheep 428. The formulation contained a strong solvent/oil which attacked the rubber in the syringe.

Sheep 316: On days 1 and 2 zeta moved very slowly to all meridians. On day 4 a 2 cm meridian sample was taken too close to the backline and the result was therefore ignored. On days 8, 11 and 14, zeta moved very slowly to the 7.5 cm and 15 cm meridians.

Sheep 611: On the treatment day this sheep fell to the floor and the backline was smudged. On day 2 excessive smudging was noticed and prevented sampling from at least some of the sites. On days 1 and 2 the 2 cm meridian sample had a high count due to the smudging and these were ignored. On day 4, the 2 and 7.5 cm wool samples were inadvertently combined.

Sheep 428: On the treatment day there was a 2 cm run. On day 1 there was possible rubbing of the backline and the high counts were ignored. On day 1, the 2 cm wool sample was clipped too close to the backline and these samples were excluded. The 2 cm meridian sites for all subsequent days had an excessively high count due to smudging and these results were ignored. On days 1,2 and 4 the 15 cm and 7.5 cm meridian samples were mistakenly reversed.

CONCLUSION

After application of zetacypermethrin along the backline of sheep using four different pour-on formulations, spread of active material was largely confined to within the 2 cm meridian lines. This spread probably occurred as a result of the organic solvents present in each of the formulations. There was little spread of zeta-cypermethrin to the 7.5 and 15 cm meridians during the 14 days of the study.

The invention claimed is:

1. A device for applying a pesticide formulation to the external surface of a domestic animal comprising:
   A) a hand-held, unitary, substantially T-shaped, manifold having a substantially hollow interior comprising:
      1) an inlet pipe; and
      2) an outlet pipe having sealed ends substantially perpendicular to said inlet pipe; and
   B) a threaded inlet fitting attached to the opposite end of said inlet pipe as said outlet pipe for connection to a source of a liquid pesticide formulation;

wherein said outlet pipe comprises a female inner portion threadably connected to a male outer portion at each end of the outlet pipe, whereby rotation of the male portion relative to the female portion alters the overall length of the outlet pipe in the manifold; and wherein said outlet pipe contains a linear arrangement of three to seven outlet holes for simultaneous application of a finished liquid pesticide formulation in discrete substantially parallel lines.

2. The device as claimed in claim 1, wherein a single outlet is provided in the female inner portion and a pair of outlets are preferably provided in each of the male outer portions.

3. The device as claimed in claim 2, wherein the outer portions of the outlet pipe include a knurled section for gripping the manifold.

* * * * *